United States Patent [19]
Hentschel

[11] 3,848,185
[45] Nov. 12, 1974

[54] CIRCUIT ARRANGEMENT FOR DETERMINING THE VOLTAGE FRACTION RATIO OF A VOLTAGE DIVIDER

[75] Inventor: Michael Hentschel, Waldhausen, Germany

[73] Assignee: Sina Aktiengesellschaft fur Instrumentierung und Automatik, Zurich, Switzerland

[22] Filed: Aug. 1, 1973

[21] Appl. No.: 384,420

[30] Foreign Application Priority Data
Aug. 4, 1972  Switzerland.................... 11555/72

[52] U.S. Cl................................. 324/57 R, 324/63
[51] Int. Cl............................................. G01r 27/00
[58] Field of Search........... 324/57 R, 65 R, 158, 63

[56] References Cited
UNITED STATES PATENTS

| | | | |
|---|---|---|---|
| 3,039,050 | 6/1962 | Krohn............................... | 324/57 R |
| 3,039,057 | 6/1962 | Connors............................ | 324/57 R X |
| 3,292,081 | 12/1966 | Kondo et al..................... | 324/57 R |
| 3,387,211 | 6/1968 | Kaufmann et al............... | 324/158 R |

Primary Examiner—Stanley T. Krawczewicz
Attorney, Agent, or Firm—William J. Daniel

[57] ABSTRACT

A circuit arrangement for determining the ratio of a voltage divider including two impedances joined at a junction and said impedances including reactance components and including resistance components at least one of which can be varied to represent a physical magnitude, said circuit arrangement comprising an oscillator circuit including an oscillation amplifier, a feedback loop coupled between an input and the output of the amplifier and contributing attenuation to the general circuit attenuation included in the oscillator circuit, and said loop having said voltage divider inserted as an attenuator in the feedback loop, means for adjusting the gain of the amplifier to a level at which oscillation is sustained by overcoming said general circuit attenuation and the attenuation of said voltage divider, and indicator means coupled to said amplifier output and operative to indicate the state of oscillation or non-oscillation of the oscillator circuit.

26 Claims, 3 Drawing Figures

CIRCUIT ARRANGEMENT FOR DETERMINING THE VOLTAGE FRACTION RATIO OF A VOLTAGE DIVIDER

The invention relates to a circuit arrangement for determining the voltage fraction ratio of a voltage divider or the value of a physical magnitude governing that ratio, the voltage divider consisting of two resistances, at least one of which is in the form of an operating resistor that is capable of variation according to the said physical magnitude and which has similarly variable and/or indeterminate parasitic reactance components and to which only alternating current can be applied.

Familiar circuit arrangements of this kind include, for example, all known a.c. bridges. For such an a.c. bridge, of course, one requires an a.c. generator, that is to say an oscillatory circuit, and also, for the bridge circuit itself, not only the voltage divider already mentioned, but also two other arms with separate means of adjustment for voltage balance and phase alignment respectively. In addition — at all events when the said operating resistor with reactance components is of high resistance and possesses stray capacitances — an amplifier with high effective resistance is needed for amplifying the bridge voltage, as well as a zero balance indicator connected to the amplifier output. The technical complication of a conventional circuit arrangement of the type referred to in the preamble is accordingly quite considerable. As is well known, moreover, zero regulation is awkward, because at least one component is required for voltage balancing and another for phase alignment, so that at least two, but usually three or four, such adjustments have to be carried out.

What the invention sets out to achieve is the provision of such a circuit arrangement, technically less complicated than the conventinal circuit arrangements already mentioned and requiring only one such adjustment for determining the ratio of voltage division.

This the invention achieves, with a circuit arrangement of the type referred to in the preamble, by the insertion of the voltage divider as an attenuator in the feedback of an oscillatory circuit equipped with means of regulating the circuit amplification thereof, whereby the attenuation produced by the voltage divider can be compensated within the circuit loop and the circuit amplification can be adjusted to unit value; and by the provision of indicators, governed by the setting of the said means of regulation, which, when the circuit amplification is adjusted to the value 1, provide a signal which corresponds to the ratio of voltage division or to the value of the physical magnitude or is a measurement value determined by one or other of those two factors.

One advantage of the circuit arrangement now proposed over the existing circuit arangements described above is that phase alignment is carried out automatically by any slight deviation of the actual frequency of oscillation of the oscillatory circuit from the nominal oscillation frequency derived from the frequency-controlling part of the oscillatory circuit, so that, in accordance with the requirement laid down, only one balancing component is necessary. Another advantage of the present circuit arrangement is that the amplifier included in the oscillatory circuit can also take over the function of the amplifier provided for amplifying the bridge voltage in the conventional circuit arrangements described above, so that it becomes possible to dispense with the additional amplifier. The present circuit arrangement also has no need for the means of phase alignment required in the said conventional circuits; and, finally, instead of the zero balance indicator needed in the latter, a far simpler two-state indicator such as an on-and-off lamp can be employed in the circuit arrangement here proposed.

The means of regulation used in the present circuit arrangement may well be a variable attenuator, preferably a potentiometer, inserted in the circuit loop.

When the attenuator is a potentiometer, the means of indication may comprise a scale, over which moves a pointer linked to the potentiometer, and at least one two-state indicator, which assumes one state when the oscillator is not oscillating and changes over to the other state when the oscillator is oscillating.

Should it be desired that the means of regulation be set not mechanically but electrically, this can be done by the use of a multiplier circuit with its input for one factor and its product output inserted in the circuit loop and with a variable direct-current voltage on its input for the other factor. The means of indication may then with advantage comprise a voltmeter and at least one two-state indicator, which assumes one state when the oscillator is not oscillating and changes over to the other state when the oscillator is oscillating.

In one recommended form of the present circuit arrangement, a Wien bridge oscilaltor is used in the oscillatory circuit feedback for frequency control. There are two ways of advantageously inserting this Wien bridge into the oscillatory circuit. In the first of these, the oscillatory circuit includes a differential amplifier and the voltage divider already mentioned is connected to the output of the latter, the Wien bridge oscillator being joined to the voltage divider tapping, preferably through an impedance changer and one input of the differential amplifier being connected to one of the other two connections of the Wien bridge. In the other method of insertion, the oscillatory circuit again includes a differential amplifier, to the output of which the Wien bridge oscillator is joined, the voltage divider being connected to one of the other two connections of the bridge, while one input of the differential amplifier is connected to the voltage divider tapping. In both cases, a second voltage divider, with its tapping joined to the other input of the differential amplifier, is connected to the output of the latter. This second voltage divider may advantageously incorporate a potentiometer constituting the means of adjustment already referred to, its tapping constituting the tapping of the second voltage divider, to which the said other input of the differential amplifier is joined. Alternatively, the second voltage divider may have a fixed voltage fraction ratio unaffected by the means of adjustment and may have its tapping connected to the said other input of the differential amplifier through a multiplier circuit, the said other input of the differential amplifier being connected to the product output of the multiplier circuit and the second voltage divider tapping to the multiplier circuit input provided for one factor, while the multiplier circuit input provided for the other factor carries a variable d.c. voltage.

If the present circuit arrangement has to reflect not only the two criteria of "circuit amplification less than 1 / oscillator not oscillating" and "circuit amplification greater than 1 / oscillator oscillating," but also a third criterion, namely "circuit amplification at least approximately equal to 1 / oscillator just oscillating," made possible by the giving of a signal when the means of adjustment are correctly set, and hence of advantage as regards automatic adjustment setting, for example, this can be achieved by the inclusion within the oscillatory circuit loop of an amplitude-governed component which, as the oscillation amplitude increases, reduces the circuit amplification, in the vicinity of a given oscillation amplitude, from an initial amplification factor to a lower level; so that when the circuit amplification is adjusted to a value of between 1 and the ratio of the first amplification factor to the second, stable oscillation is set up in the oscillator at the predetermined amplitude; for adjustment to a value higher than this, there is oscillation at an amplitude above the predetermined level, preferably in the vicinity of saturation of the amplifier provided in the oscillatory circuit; and when the circuit amplification is adjusted to a value of less than 1, no oscillation takes place in the oscillator. The said initial amplification factor should be at most 5 percent, and preferably less than 3 percent, higher than the second amplification factor. The amplitude-governed component may well be an attenuator incorporating non-linear circuit elements, its attenuation increasing, as the amplitude of oscillation rises, in the vicinity of the predetermined amplitude, from an initial attenuation factor preferably in the region of zero, to a second attenuation factor. For distinguishing between the three possible oscillator states, namely "not oscillating", "oscillating at predetermined amplitude" and "oscillating at above predetermined amplitude", the oscillatory circuit may furthermore be connected to a suitable evaluator having two threshold-value circuits for the purpose. The means of indication may well comprise a lamp indicator controlled by the evaluator so as to switch on when the oscillator oscillates at the predetermined amplitude and off when the oscillator is in either of the other two states; alternatively, it may include two lamp indicators controlled by the evaluator, one of which is switched on by the latter when there is no oscillation and off when the oscillator is in either of the other two states, while the other lamp is switched on by the evaluator when the oscillator oscillates at above the predetermined amplitude and off when the oscillator is in either of the other two states.

When the means of adjustment are required to be set automatically, a setting device controlled by the evaluator automatically, a setting device controlled by the evaluator may be provided for the purpose. This, when the oscillator is not oscillating, is caused by the evaluator to move the means of adjustment so as to increase the circuit amplification and, when the oscillator oscillates at above the predetermined amplitude, to move the means of adjustment so as to reduce the circuit amplification, so that automatic adjustment of the circuit amplification to at least approximately the value 1 is obtained. Where a potentiometer is provided in the circuit loop as the means of adjustment, an electric motor may be used for setting the potentiometer. On the other hand, should automatic setting by purely electrical means be preferred to this automatic setting by electro-mechanical means, this can be achieved by the provision of a multiplier circuit, of which the input for one factor and the product output are inserted into the circuit loop, while the input provided for the other factor carries a variable d.c. voltage; in that event, the setting device provided may with advantage be a capacitor and means whereby it is charged when the oscillator is not oscillating and discharged when the oscillator oscillates at above the predetermined amplitude, the said input of the multiplier circuit provided for the other factor being connected to the capacitor.

The invention relates furthermore to the use of the proposed new circuit arrangement for regulating the physical magnitude to a desired value, whereby the means of adjustment are set in such a way that when the physical magnitude assumes the desired value the circuit amplification lies between the value 1 and the ratio of the aforesaid initial amplification factor to the aforesaid second amplification factor; and whereby the said evaluator controls means of varying the value of the physical magnitude in such a way that when the oscillator is not oscillating the value of the physical magnitude is altered so as to increase the circuit amplification of the oscillatory circuit, and when the oscillator oscillates at above the predetermined amplitude the value of the physical magnitude is altered so as to reduce the circuit amplification of the oscillatory circuit.

The invention is described in detail hereunder in conjunction with the following drawings of a practical example, in which.

Figure 1:
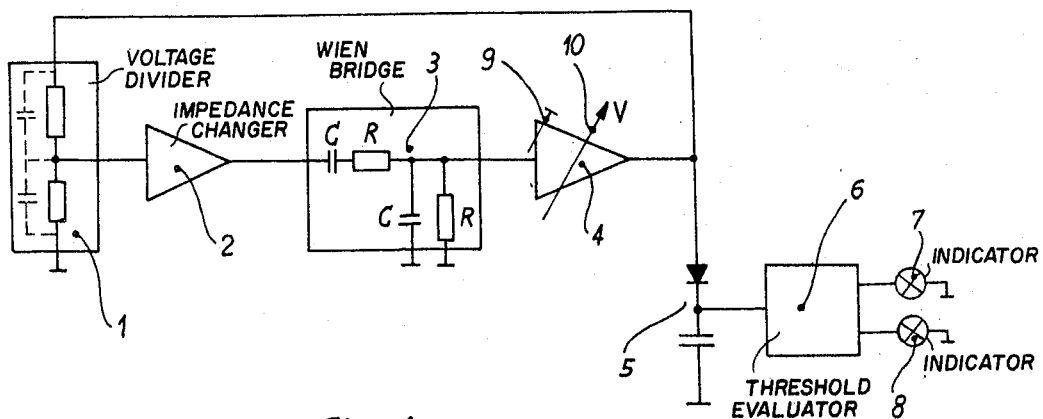
FIG. 1 is a block diagram of an example of the proposed new circuit arrangement.

The circuit arrangement shown in block form in FIG. 1 consists of the following units: the voltage divider 1 with the resistors under inventigation, an impedance changer 2, a Wien bridge oscillator, 3, a variable amplifier, 4, a rectifier circuit, 5, a double threshold-value circuit, 6, and two lamps indicators connected externally, 7 and 8, by way of example.

As is well known, an oscillatory circuit starts to oscillate when the total amplification acting in the circuit is at least as great as the total attenuation present. The attenuation in the circuit arrangement shown in block form in FIG. 1 arises partly from the voltage divider with the resistors under investigation and partly from the cathode follower 2 and the Wien bridge oscillator 3; the amplification is produced by the amplifier 4. This amplification can be adjusted in two ways: the one regulator at 9 serves to provide compensation for all attenuation within the circuit loop except that derived from the voltage divider, while the other regulator at 10 provides compensation for the attenuation caused by the voltage divider 1 until the point is reached at which oscillation just occurs. This latter regulator, 10, may be provided with a scale, from which can be read the resistance ratio of the two resistors in 1 or some other convenient magnitude associated with that resistance ratio. The oscillations produced are rectified in the rectifier circuit 5 and compared in the thresholdvalue circuit 6 with two fixed d.c. voltages. Should the adjusted amplification 10 be too low, there will be no oscillations and the rectified voltage will be zero, that is to say less than the two fixed d.c. voltages. In that case, the threshold-value circuit 6 will emit an initial signal, causing the lamp 8 to glow. Should the amplification be so regulated at 10 that oscillations are just occurring, the rectified voltage will lie between the two fixed d.c. voltages, in which case the threshold-value circuit 6 will emit no signal and neither of the two lamps 7 and 8 will glow. With over-amplification at 10, the amplitude of oscillation will increase and the rectified voltage will be greater than the two fixed d.c. voltages, in which case the threshold-value circuit 6 will emit a second signal, causing the lamp 7 to glow.

Figure 2:
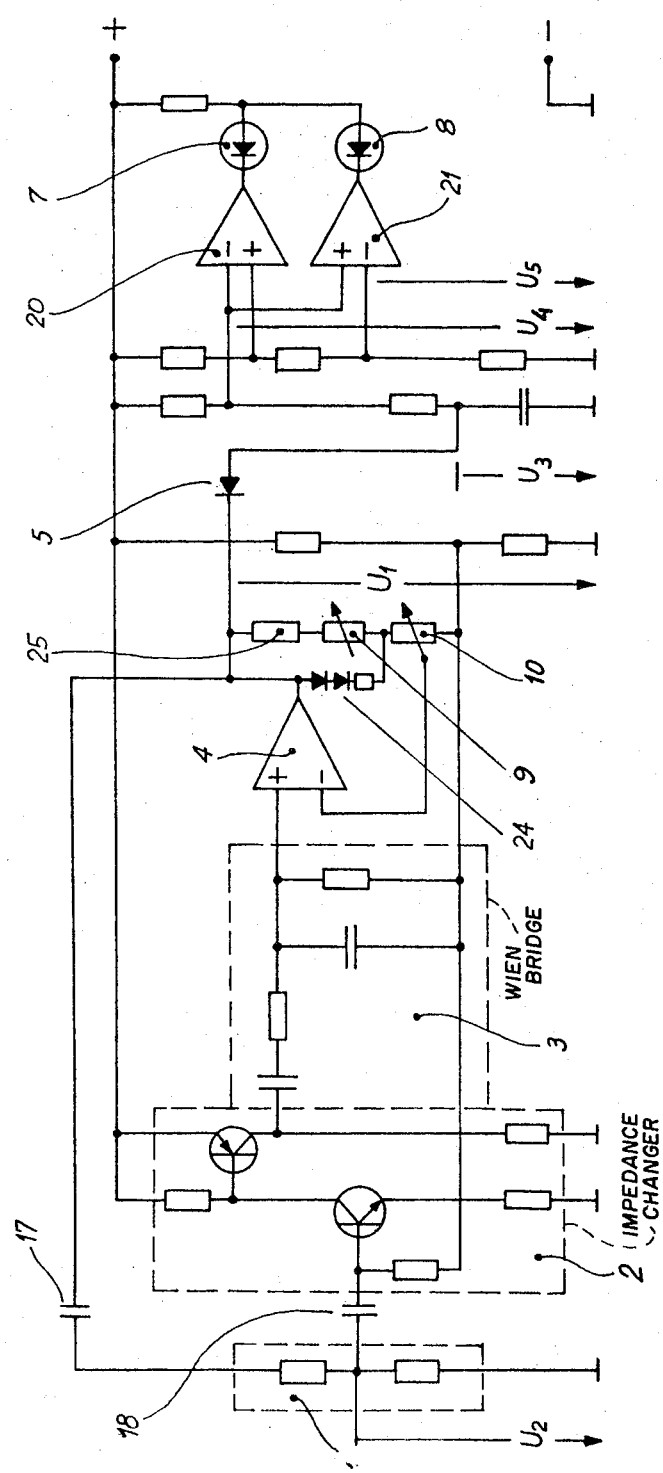
FIG. 2 is a circuit diagram of the circuit arrangement shown in block form in FIG. 1.

In the circuit diagram in FIG. 2, showing the circuit arrangement seen in block form in FIG. 1, the operating amplifier 4 represents the oscillation amplifier of the circuit arrangement. The oscillation frequency is controlled by the Wien bridge oscillator 3. The potentiometers 9 and 10 serve to adjust the amplification of the oscillatory circuit, the setting resistor 9 providing compensation for fixed attenuation such as that arising from the impedance changer 2, which is caused by reason of the amplification $V_I$ of the impedance changer not attaining the ideal value of 1. Hence the potentiometer 10 alone provides compensation for the attenuation produced by the voltage divider 1 with the pair of resistors under investigation.

Figure 3:
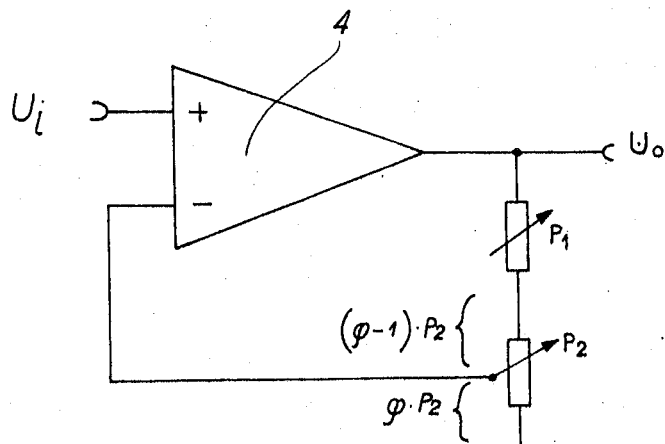
FIG. 3 shows in simplified form a differential amplifier, 11, and the setting resistor 13 and the potentiometer 14, forming part of the circuit arrangement shown in FIG. 2.

It can be shown that the two amplification settings are independent of each other. In FIG. 3, part of the circuitry in FIG. 2 is reproduced, with the operational amplifier 4 and two amplification regulators, the fixed resistance between the output of amplifier 4 and the setting resistor 9 in FIG. 2 being included in FIG. 3 in the setting resistor $P_1$. The amplification P of this operational amplifier 11 may be expressed as follows:

$$V = U_o/U_i = P_l + P_2/\phi \cdot P_2$$

in which $\phi$ stands for the displacement angle of the potentiometer $P_2$.

The above expression may also be written in the form:

$$V = 1/\phi \cdot P_1 + P_2/P_2$$
$$V = V_1 \cdot V_2$$

It will be noted that the amplification V is formed as the product of the amplification factors $V_1$ and $V_2$, $V_1$ depending solely on the displacement angle $\phi$ of the potentiometer $P_2$, while $V_2$ is governed only by the setting of the resistor $P_1$. The two amplification adjustments are thus independent of each other.

The voltage divider 1 in FIG. 2 is fed through a capacitor, 17, which holds back d.c. voltage components, from the oscillator output with the a.c. voltage $U_1$. At the output of the voltage divider, there arises an a.c. voltage, $U_2$, which, according to the dividing ratio between the pair of resistors 1, is smaller than the oscillator output voltage $U_1$. To avoid placing too heavy a load on the voltage divider 1, the voltage $U_2$ is uncoupled via the impedance changer 2 and led to the input of the Wien bridge 3, by which the oscillator coupling circuit is closed.

The oscillator voltage is furthermore rectified via the diode 5, the rectified voltage being deducted from the positive operating voltage. The resultant voltage $U_3$ is compared by the operational amplifiers 20 and 21 with the d.c. voltages $U_4$ and $U_5$. Should the voltage $U_3$ be smaller than $U_5$, the glow diode 8 corresponding to the second signal previously mentioned is brought into action. Should the value of the voltage $U_3$ lie between the values of the voltages $U_4$ and $U_5$, neither of the glow diodes 7 and 8 is brought into play. If, finally, the voltage $U_3$ should be greater than the voltage $U_4$, the glow diode 7 will be operated, thus giving the initial signal previously mentioned. In this way, one ensures that two output signals cannot be displayed simultaneously.

So that the oscillatory circuit may be brought to a condition of stability at the oscillation amplitude at which the value of the voltage $U_3$ lies between the values of the voltages $U_4$ and $U_5$, an attenuator is provided at 24, comprising two diodes and a resistor in series. At the oscillation amplitude in question, at which $U_3$ lies between $U_4$ and $U_5$, these two diodes become conductive and thus bring $U_4$ and $U_5$, these two diodes become conductive and thus bring the resistor in series with them parallel to the series-connected resistors 9 and 25. The result is an increased attentuation in the vicinity of the oscillation amplitude just referred to, so that the oscillation of the oscillator is stabilised at that amplitude. The resistance in series with the two diodes is 20 to 50 times as great as the sum of the resistances of 9 and 25.

I claim is:

1. A circuit arrangement for determining the ratio of a voltage divider including two impedances joined at a junction and said impedances including reactance components and including resistance components at least one of which can be varied to represent a physical magnitude, said circuit arrangement comprising an oscillator circuit including an oscillation amplifier, a feedback loop coupled between an input and the output of the amplifier and contributing attenuation to the general attenuation included in the oscillator circuit, and said loop having said voltage divider inserted as an attenuator in the feedback loop, means for adjusting the gain of the amplifier to a level at which oscillation is sustained by overcoming said general circuit attenuation and the attenuation of said voltage divider, and indicator means coupled to said amplifier output and operative to indicate the state of oscillation or non-oscillation of the oscillator circuit.

2. A circuit arrangement as in claim 1, wherein said amplifier gain adjustment means comprises an attenuator coupled to form a negative feedback loop between an amplifier input and its output.

3. A circuit arrangement as in claim 2, wherein said amplifier gain adjustment means comprises a potentiometer calibrated by a scale and cooperating pointer, and wherein said indicator means comprises a two state indicator operative to assume one state when the oscillator circuit is not oscillating and to assume the other state when the oscillator is oscillating.

4. A circuit arrangement as in claim 1, wherein said amplifier gain adjustment means comprises a multiplier circuit having two inputs and a product output comprising the product of the two inputs, one of its inputs and its ouput being coupled in said feedback loop, and the other of its inputs being coupled to a variable direct current source.

5. A circuit arrangement as in claim 4, wherein said indicator means comprises voltage responsive means coupled to the output of the amplifier and driving a two-state indicator which assumes one state when the oscillator circuit is not oscillating and the other state when the oscillator is oscillating.

6. A circuit arrangement as in claim 1, wherein said feedback loop includes a frequency control circuit comprising a Wien bridge circuit.

7. A circuit arrangement as in claim 6, wherein said oscillator amplifier comprises a differential amplifier, said voltage divider being coupled across its output, and said Wien bridge circuit being coupled between said junction of the voltage divider and one input of the differential amplifier, and said amplifier gain adjustment means comprising a second voltage divider connected across the amplifier output and connected to the other input of the differential amplifier.

8. A circuit arrangement as in claim 7, wherein an impedance changer is interposed between said voltage divider junction and said Wien bridge circuit.

9. A circuit arrangement as in claim 6, wherein said oscillator amplifier comprises a differential amplifier, said Wien bridge circuit having an input connected to the output of the amplifier and having an output, the voltage divider being connected across the latter output and having its junction coupled to one input of the differential amplifier, and said amplifier gain adjustment means comprising a second voltage divider connected across the amplifier output and connected to the other input of the differential amplifier.

10. A circuit arrangement as in claim 7, wherein said second voltage divider comprises a potentiometer having an adjustable tap connected to said other input of the differential amplifier.

11. A circuit arrangement as in claim 9, wherein said second voltage divider comprises a potentiometer having an adjustable tap connected to said other input of the differential amplifier.

12. A circuit arrangement as in claim 7, wherein said amplifier gain adjustment means includes a multiplier circuit having two inputs and a product output, and said second voltage divider including a fixed tap and a variable tap, the variable tap being connected to one of the inputs of the multiplier circuit and the product output of the multiplier circuit being connected to the other input of the differential amplifier, and the fixed tap of the second voltage divider being connected to the other input of the multiplier circuit.

13. A circuit arrangement as in claim 9, wherein said amplifier gain adjustment means includes a multiplier circuit having two inputs and a product output, and said second voltage divider including a fixed tap and a variable tap, the variable tap being connected to one of the inputs of the multiplier circuit and the product output of the multiplier circuit being connected to the other input of the differential amplifier, and the fixed tap of the second voltage divider being connected to the other input of the multiplier circuit.

14. A circuit arrangement as in claim 1, wherein said oscillator amplifier and said feedback loop together comprise an oscillatory loop, an amplitude-responsive component in the oscillatory loop operative to change the amplification from a first higher amplification factor to a second lower amplification factor in response to oscillations occurring in the oscillatory loop within a range resulting from circuit amplification greater than unity but less than the ratio of said first to said second amplification factors, whereby within this range the amplitude of oscillation is stabilized to a predetermined level, above this range the oscillation amplitude increases rapidly, and below this range there is no oscillation.

15. A circuit arrangement as in claim 14, wherein above said range said oscillator amplifier oscillates to saturation levels.

16. A circuit arrangement as in claim 14, wherein said first amplification factor is at most 5 percent greater than said second factor.

17. A circuit arrangement as in claim 14, wherein said first amplification factor is at most 3 percent greater than said second factor.

18. A circuit arrangement as in claim 14, wherein said amplitude responsive component comprises a nonlinear circuit whose attenuation increases as the amplitude of oscillation rises in said range of amplitudes.

19. A circuit arrangement as in claim 14, wherein said amplitude responsive component has an attenuation extending from the vicinity of zero to a higher finite value.

20. A circuit arrangement as in claim 14, wherein said indicator means includes an evaluator having two threshold level circuits respectively having values marking the upper and lower limits of said range of amplitudes, and further includes means for indicating oscillation amplitudes distinguished by these levels as being at zero level, at a level within said range, and at a level above said range.

21. A circuit arrangement as in claim 20, wherein said means for indicating said levels comprises comparison means for comparing the oscillation level with said threshold levels, and indicator lamps controlled by said comparison means.

22. A circuit arrangement as in claim 20, wherein said evaluator means comprises comparison means comparing the oscillation level with the lower threshold level, and an indicator lamp actuated by the comparison means when the oscillation level is below the lower threshold, and comparison means comparing the oscillation level with the upper threshold level and an indicator lamp actuated by the comparison means when the oscillation level is above the upper threshold.

23. A circuit arrangement as in claim 20, including drive means for adjusting the amplifier gain adjustment means, the drive means being coupled for control by said means for indicating said levels and operated thereby to increase the gain of the oscillation amplified when the circuit is not oscillating and to reduce the oscillator amplifier gain toward unity when the oscillation amplitude is above said range of amplitudes.

24. A circuit arrangement as in claim 23, wherein said means for adjusting the gain is a potentiometer, and said drive means is an electric motor coupled to drive the potentiometer.

25. A circuit arrangement as in claim 23, said amplifier gain adjustment means includes a multiplier circuit having two inputs and a product output comprising the product of the two inputs, one of its inputs and its product output being coupled in said feedback loop, and the other of its inputs being coupled to a variable direct-current source comprising a capacitor, and means for charging the capacitor when the oscillator is not oscillating, and substractive means coupled to the oscillation circuit and operative to reduce the charge in the capacitor when the oscillation amplitude is above said range.

26. A circuit arrangement as in claim 20, wherein at least one of said reactance components of said voltage divider includes means for regulating it to a desired value, and wherein said means for indicating oscillation amplitudes with respect to said range includes means for varying the regulating means such that when the oscillator circuit is not oscillating the resistance component is varied to reduce the attenuation of the voltage divider and when the oscillator circuit is oscillating at an amplitude above said range the resistance component is varied to increase the attenuation of the voltage divider.

* * * * *